United States Patent
Zlotnik et al.

(10) Patent No.: US 11,888,318 B2
(45) Date of Patent: Jan. 30, 2024

(54) TRANSIENT LOAD MANAGEMENT FOR A SYSTEM-ON-CHIP MEETING AN ACTIVITY THRESHOLD

(71) Applicant: Micron Technology, Inc., Boise, ID (US)

(72) Inventors: Leon Zlotnik, Camino, CA (US); Leonid Minz, Beer Sheva (IL); Ekram H. Bhuiyan, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/715,552

(22) Filed: Apr. 7, 2022

(65) Prior Publication Data
US 2023/0327444 A1  Oct. 12, 2023

(51) Int. Cl.
  *G06F 1/324* (2019.01)
  *H02J 3/14* (2006.01)
  *H02J 3/24* (2006.01)
  *H02J 3/02* (2006.01)
(52) U.S. Cl.
  CPC ............... *H02J 3/14* (2013.01); *G06F 1/324* (2013.01); *H02J 3/02* (2013.01); *H02J 3/241* (2020.01)
(58) Field of Classification Search
  CPC ........................................... G06F 1/324
  See application file for complete search history.

(56) References Cited

U.S. PATENT DOCUMENTS

| | | | |
|---|---|---|---|
| 3,430,070 A | 2/1969 | Marshall, Jr. et al. | |
| 5,179,295 A | 1/1993 | Mattison et al. | |
| 5,767,717 A | 6/1998 | Schorn et al. | |
| 9,599,672 B2 | 3/2017 | Abhishek et al. | |
| 2006/0294282 A1 | 12/2006 | Warner | |
| 2008/0203993 A1* | 8/2008 | Lee | G06F 1/3203 323/318 |
| 2012/0102345 A1* | 4/2012 | Park | G06F 1/3253 713/322 |
| 2016/0142201 A1* | 5/2016 | Weiner | G06F 1/3206 375/354 |
| 2019/0043737 A1* | 2/2019 | Hutton | G06F 1/206 |
| 2020/0201408 A1* | 6/2020 | Lehwalder | G06F 1/28 |
| 2022/0365580 A1* | 11/2022 | Dibbad | H02H 9/02 |

FOREIGN PATENT DOCUMENTS

WO  WO-2015152578 A1 * 10/2015 ............... G06F 1/26

* cited by examiner

*Primary Examiner* — Suresh Suryawanshi
(74) *Attorney, Agent, or Firm* — Brooks, Cameron & Huebsch, PLLC

(57) ABSTRACT

Sensing circuitry and clock management circuitry provide transient load management. The sensing circuitry detects a voltage, current, and/or activity associated with a system-on-chip (SoC) and determines whether the detected voltage, current, and/or activity meets a threshold. The clock management circuitry generates clocking signals for the SoC and alters a frequency of the generated clocking signals in response to the detected voltage, current, and/or activity meeting the threshold to alter an amount of power consumed by the SoC.

23 Claims, 6 Drawing Sheets

TRANSIENT LOAD MANAGEMENT FOR A SYSTEM-ON-CHIP MEETING AN ACTIVITY THRESHOLD

TECHNICAL FIELD

Embodiments of the disclosure relate generally to digital logic circuits, and more specifically, relate to transient load management.

BACKGROUND

A memory system can include one or more digital circuits that can include various circuitry. In general, a portion of the circuitry can provide a voltage signal to power the digital circuits and/or to power components of the memory system.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
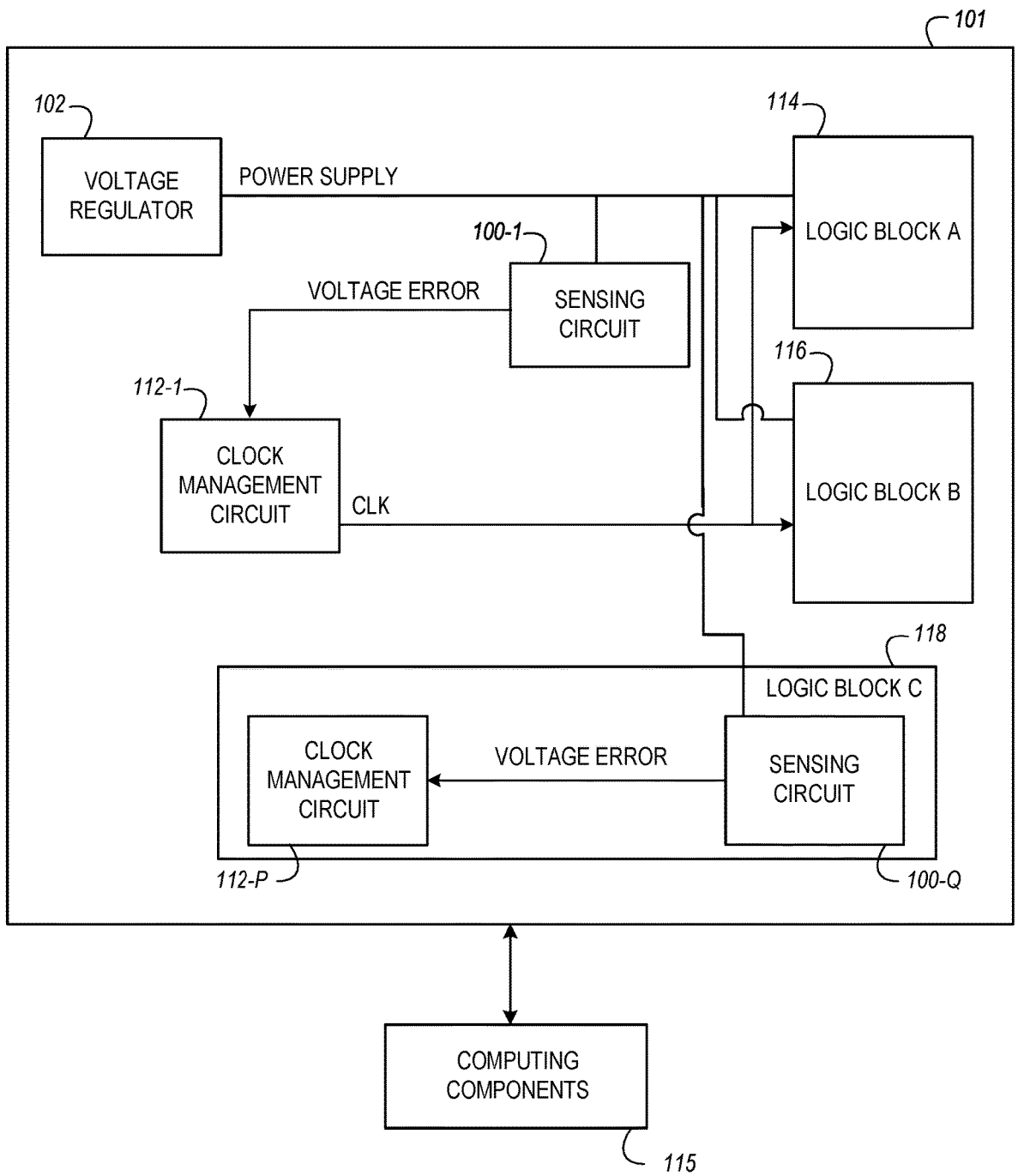
FIG. 1 illustrates an example system including voltage sensing circuits for transient load management in accordance with some embodiments of the present disclosure.

Aspects of the present disclosure are directed to transient load management. Transient load management can be achieved through the use of a sensing circuit (e.g., a voltage sensing circuit, current sensing circuit, activity sensing circuit, etc.) that can determine an instantaneous voltage associated with a system (e.g., a System-on-Chip (SoC), application-specific integrated circuit (ASIC), field-programmable gate array (FPGA), or other hardware circuitry) and clock management circuitry in order to reduce power consumption and/or to improve performance in the system in comparison to approaches that do not employ such transient load management. The sensing circuit(s), in concert with the clock management circuitry described herein can provide benefits in systems that rely on instantaneous (or near-instantaneous) sensing of voltages, currents, activities, or other such parameters to track, limit, adjust, and/or manipulate power consumption and/or noise dynamically. Examples of apparatuses and systems that employ transient load management in accordance with embodiments of the present disclosure are described below in conjunction with FIG. 1, et alibi.

Some sensing circuits (e.g., voltage sensing circuitry, current sensing circuitry, activity sensing circuitry, etc.) can allow for clock gate signals (e.g., fine grain clock gate signals) to be collected and summed to determine a quantity of open (e.g., activated or "enabled") clock gate signals at any given time (e.g., at any given rising or falling clock edge). Because the quantity of open clock gate signals can correspond to respective different groups of latches or flip-flops that can include varying quantities of latches or flip-flops, the switching activity associated with the open clock gates can correspond to activity within a particular partition (e.g., portion) of, or an entire core of, for example, an application-specific integrated circuit (ASIC). Accordingly, the quantity of open clock gate signals can be utilized as an indication of the switching activity of the system and, hence, power consumption, current flow, and/or noise associated with the system. As described in more detail herein, such indications can be processed to generate an activity indication that can be used to instantaneously (or near-instantaneously) provide voltage and/or current sensing to track, limit, adjust, and/or manipulate power consumption and/or noise of the system in which the sensing circuitry is deployed and/or to components external to the system dynamically.

For example, the sensing circuitry described herein can allow for an activity weight to be assigned to one or more fine grain clock gates based on a quantity of latches (e.g., edge-triggered latches, level-sensitive latches, etc.) or flip-flops associated with each of the fine grain clock gates. The activity weight can be assigned during full ASIC logic synthesis and/or during synthesis performed as part of an ECO. The activity weight can correspond to an "activity indication" and can be used to instantaneously (or near-instantaneously) provide current sensing to track, limit, adjust, and/or manipulate power consumption and/or noise dynamically in a system or circuit, such as a system-on-chip (SoC), an ASIC, an FPGA, or other suitable circuitry that utilizes digital logic components. These and other aspects of the present disclosure can provide for a reduction in power consumption in various types of systems, computing devices, and/or circuits; thereby providing an improvement to computing devices in which aspects of the present disclosure are deployed.

In other embodiments, the sensing circuit(s) described herein include various circuit components (e.g., voltage regulators, sensor circuits, delay circuits, detector circuits, etc.) that can allow for instantaneous voltages within the system to be determined. As described in more detail, herein, the sensing circuit(s) can include a first oscillator circuit (e.g., a free-running oscillator) that is powered from a rail of a voltage regulator (e.g., a rail of a voltage regulator that is local to the system and/or provides a measured voltage that may or may not be coupled to a main power supply of a system associated with the sensing circuit(s)). In this orientation, the oscillator circuit can serve as a voltage sensor that is part of the sensing circuitry. The sensing circuit(s) can further include a second oscillator circuit (e.g., a reference oscillator or delay circuit) that is powered from a separate voltage supply (e.g., a voltage regulator that provides a stable voltage that is characterized by low noise and/or low voltage fluctuation, such as a threshold voltage to a system associated with the sensing circuit(s)).

In such embodiments, frequency differences between the oscillator circuits can be compared to determine an instantaneous sense voltage value that corresponds to the actual sensed voltage at a particular moment in time of the system associated with the sensing circuit(s). In addition, a phase difference between one of the oscillator circuits and a delay circuit can be compared to determine an instantaneous sense voltage value that corresponds to the actual sensed voltage at a particular moment in time of the system associated with the sensing circuit(s). In the case of compared frequencies, a difference in the compared frequencies indicates that oscillators are subjected to differing voltages, while in the case of the phase associated with a signal from the oscillator being compared to the delay circuit, a phase difference may be detected with the oscillator and the delay circuit are subjected to differing voltage. By allowing for instantaneous (or near-instantaneous) voltage sensing using the sensing circuit(s) described herein, electrical signals, such as voltages, within the system can be tracked, limited, adjusted, and/or manipulated to dynamically alter power consumption and/or noise in the system, and, in particular in automated power management systems.

Through utilization of the sensing circuit(s) and/or clock management circuitry described herein, transient load management can be provided to a system and/or components coupled to the system. For example, sensing circuitry can be deployed in a system (e.g., a SoC, ASIC, FPGA, etc.) to detect voltage characteristics (e.g., a voltage drop or "IR drop"), current characteristics, and/or activity characteristics in locations within the system that may be especially prone to exhibiting IR drop phenomena. As described in more detail herein, responsive to the voltage characteristics meeting a threshold voltage (e.g., responsive to the detected voltage characteristics being indicative of an IR drop having greater than or less than a particular magnitude), clock management circuitry can cause clocking signals generated thereby to be altered to attenuate the IR drop. Similarly, responsive to current characteristics and/or activity characteristics meeting a threshold, clock management circuitry can cause clocking signals generated thereby to be altered to attenuate the power consumed in the system.

In embodiments in which the clock management circuitry causes clocking signals to be slowed down (e.g., to occur at a lower frequency), it is possible to reduce power consumption of the system thereby reducing or otherwise mitigating the current raise, voltage drop, and/or activity characteristics. Conversely, in embodiments in which the clock management circuitry causes clocking signals to be sped up (e.g., to occur at a greater frequency), it is possible to increase power consumption of the system thereby providing increased power in the event of a sudden decrease in power provided to the system or to attenuate voltage overshoots and/or current drops. As described in more detail herein, some embodiments allow for the clocking signals to be decreased and increased during different time periods to ensure that the system does not consume power in excess of a defined power limit available to the system.

FIG. 1 illustrates an example system 101 including sensing circuits 100-1 to 100-Q in accordance with some embodiments of the present disclosure. The example system 101, which can be referred to in the alternative as an "apparatus," includes a voltage regulator 102 that is configured to generate and apply a power supply signal (e.g., a supply voltage signal) to the sensing circuits 100-1 to 100-Q and/or to other components of the system 101. In some embodiments, the sensing circuits 100-1 to 100-Q can be referred to in the alternative as "voltage sensing circuits 100-1 to 100-Q;" however, it shall be borne in mind that the sensing circuits 100-1 to 100-Q can sense or otherwise detect current and/or activity in a system.

The system 101 is couplable to one or more computing components 115. The computing components 115 are generally external to the system 101 (i.e., the computing components are physically distinct from a chip, such a SoC that the system 101 is deployed on) but are communicatively couplable to the system 101 such that signaling can be exchanged between the system 101 and the computing components 115. Non-limiting examples of the computing components 115 can include controllers, memory devices, graphics processing units, processors/co-processors, and/or logic blocks, among others that are connected to a computer in which the system 101 operates.

Figure 2:
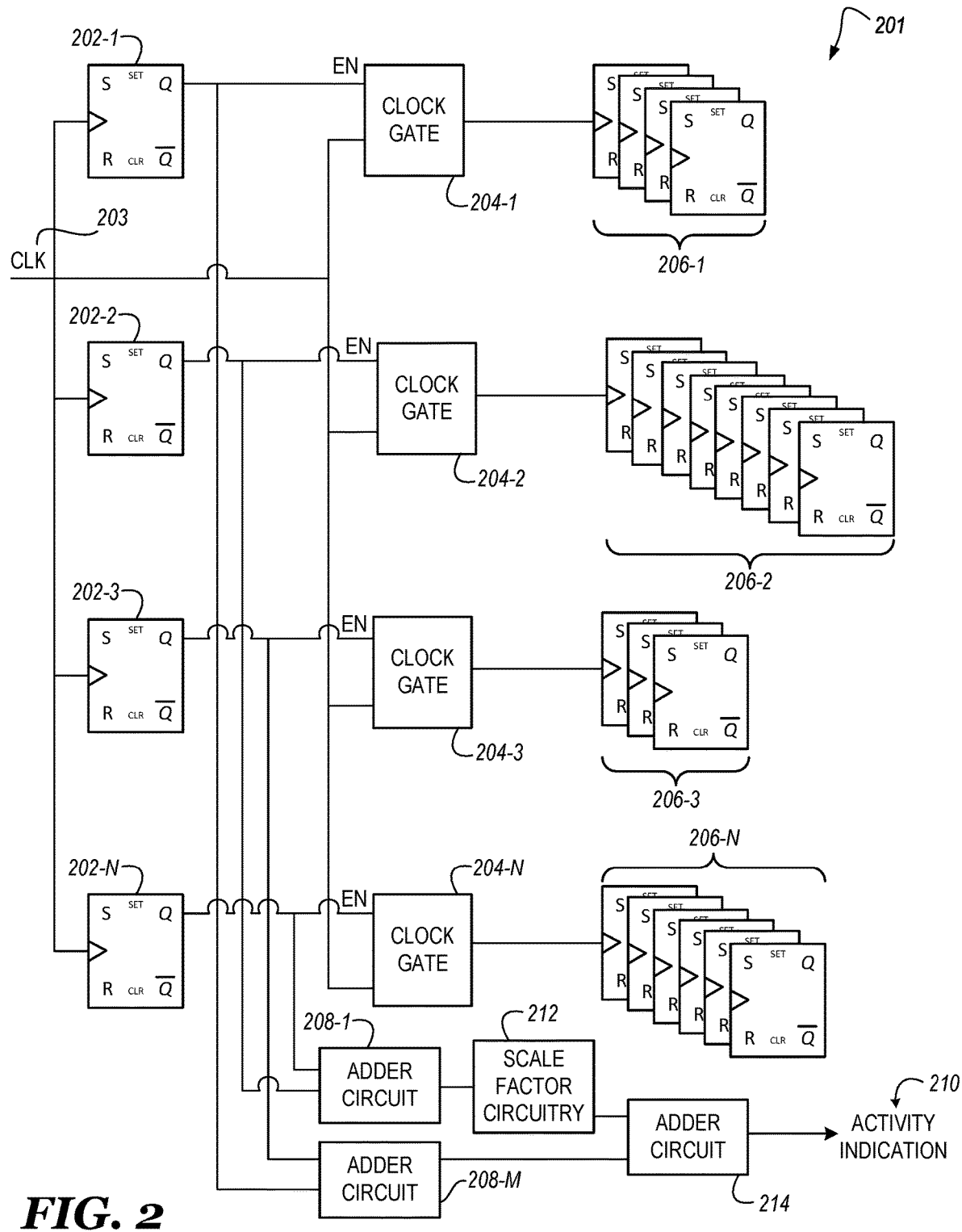
FIG. 2 illustrates an example system for transient load management in accordance with some embodiments of the present disclosure.
Figure 3:
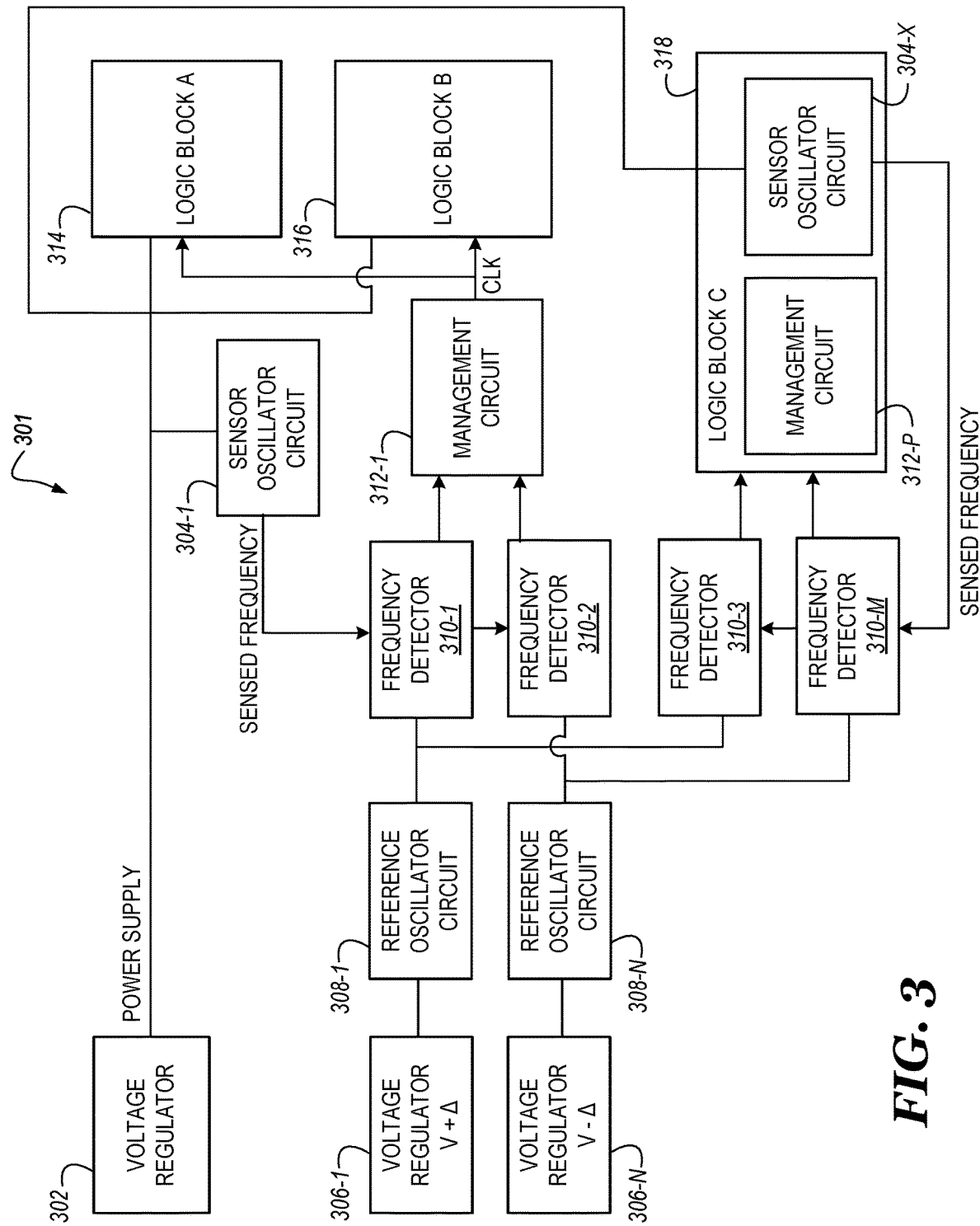
FIG. 3 illustrates another example system for transient load management in accordance with some embodiments of the present disclosure.
Figure 4:
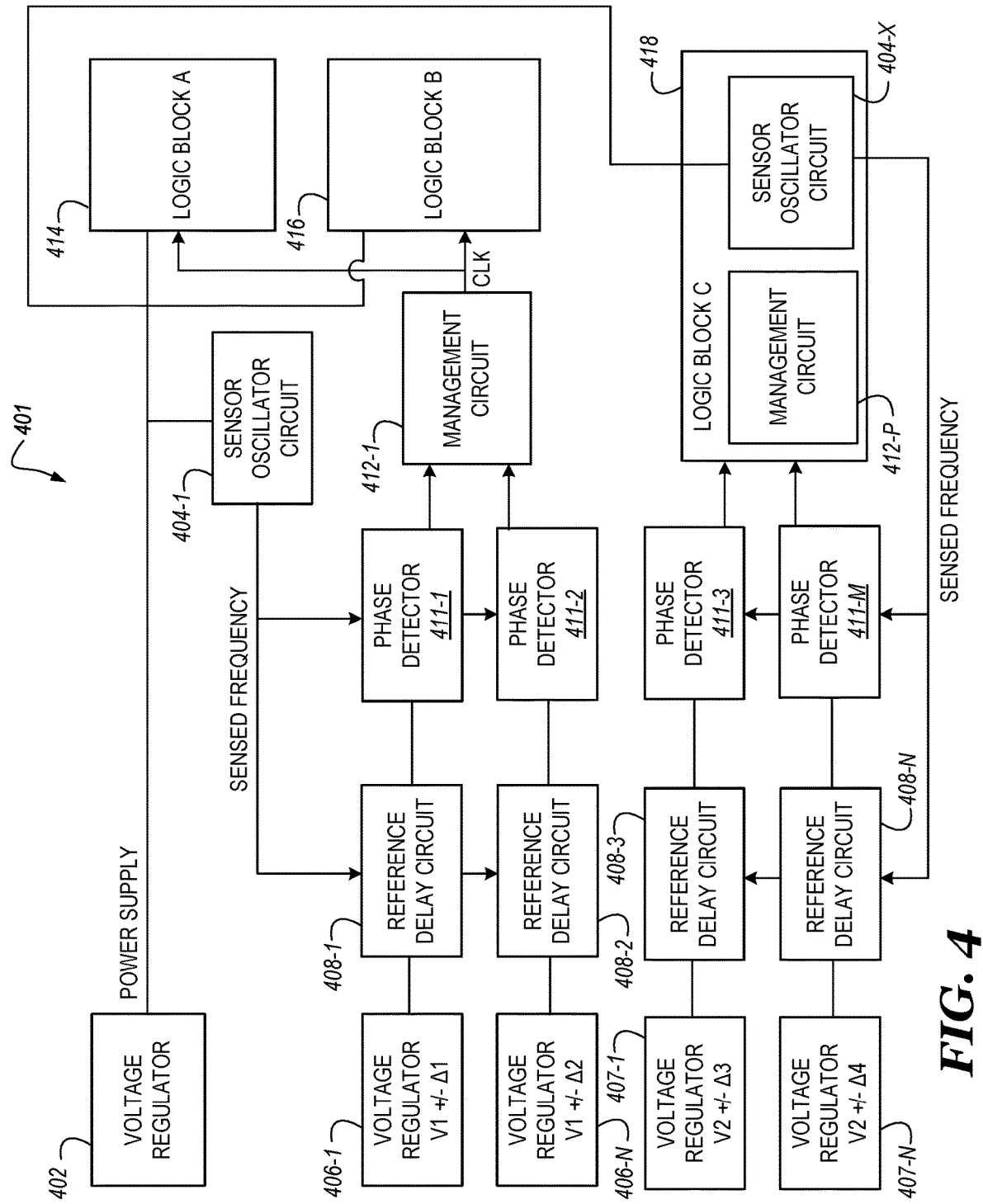
FIG. 4 illustrates yet another example system for transient load management in accordance with some embodiments of the present disclosure.

In some embodiments, the sensing circuits 100-1 to 100-Q can be any type of circuit that is configured to instantaneously (or near-instantaneously) sense a voltage or change in voltage (e.g., an IR drop) in the power supply signal. Some examples of sensing circuits 100-1 to 100-Q are illustrated in FIGS. 2-4, herein. In addition to, or in the alternative, the sensing circuits 100-1 to 100-Q can include an analog comparator, an oscillator circuit, a phase detection circuit, and/or a digital-to-analog converter. In some embodiments, the system 101 is a system-on-chip (SoC), application-specific integrated circuit (ASIC), or a field-programmable gate array (FPGA), among other possibilities.

As shown in FIG. 1, the sensing circuits 100-1 to 100-Q can issue signaling indicative of a voltage error to clock management circuitry 112-1 to 112-P. The voltage error signaling can correspond to a change in the power supply voltage that is greater than a threshold amount of voltage change thereby leading to a voltage spike, voltage drop, IR drop, or other phenomenon indicative of a transient load event occurring within the system 101. As described in more detail herein, the voltage error signaling can be applied to the clock management circuitry 112-1 to 112-P and the clock management circuitry 112-1 to 112-P can cause clock signals generated thereby to be altered to provide transient load management in accordance with the disclosure.

As shown in FIG. 1, the system 101 includes clock management circuitry 112-1 to 112-P. The clock management circuitry can be configured to generate and apply clocking signals to various components of the system, such as the logic block A 114, the logic block B 116, and/or the logic block C 118. Embodiments are not so limited, however, and the clock management circuitry 112-1 to 112-P can generate and apply clocking signals to components external to the system 101, as described in more detail herein. Advantageously, the clock management circuitry 112-1 to 112-P can be configured to alter a frequency of the clock signals generated thereby, as will be described in more detail below.

The clock management circuitry 112-1 to 112-P can include hardware circuitry configured to perform the operations described herein. For example, the clock management circuitry 112-1 to 112-P can include one or more chips or other hardware circuitry that is configured to generate periodically oscillating signals (e.g., square waves) that are applied to components of the system 101. In some embodiments, the clock management circuitry 112-1 to 112-P includes throttling circuitry, clock division circuitry, a clock synthesizer, a phase-locked loop system, and/or a voltage-controlled oscillator to facilitate embodiments of the present disclosure.

As shown in FIG. 1, the system 101 further includes logic block A 114, logic block B 116, and logic block C 118. The logic block A 114, the logic block B 116, and/or the logic block C 118 can include various hardware that form one or more cores (e.g., "intellectual property (IP) cores"). As used herein, a "core" or "IP core" generally refers to one or more blocks of data and/or logic that form constituent components of an application-specific integrated circuit or field-programmable gate array. The logic block A 114, the logic block B 116, and/or the logic block C 118 can be designed, built, and/or otherwise configured to perform specific tasks and/or functions within the systems described herein. Although explicitly referred to as "logic" blocks, the blocks 114, 116, and/or 118 can be other types of blocks (e.g., IP cores, processors, controllers, etc.). In some embodiments, the voltage sensing circuit 100 can take an action (or cause an action to be taken) to track, limit, adjust or manipulate the dynamic power available to the voltage sensing circuit 100 to provide voltage manipulation to the logic block A 114, the logic block B 116, and/or the logic block C 118.

In some embodiments, at least one voltage sensor circuit (e.g., the voltage sensor 100-Q) and/or at least one clock management circuitry (e.g., the clock management circuit 112-P) can be resident on one of the logic blocks (e.g., the logic block C 118). As used herein, the term "resident on" refers to something that is physically located on a particular component. For example, the sensor circuit 100-Q and/or the clock management circuit 112-P being "resident on" the logic block C 118 refers to a condition in which the hardware circuitry that comprises the sensor circuit 100-Q and/or the clock management circuit 112-P is physically located on the logic block C 118. The term "resident on" may be used interchangeably with other terms such as "deployed on" or "located on," herein.

In a non-limiting example, an apparatus can include sensing circuitry (e.g., at least one of the sensing circuits 100-1 to 100-Q) configured to detect activity, such as a voltage, current, and/or activity associated with a system-on-chip (SoC) (e.g., the system 101) and determine whether the detected voltage, current, and/or activity meets a threshold value (e.g., a voltage threshold, a current threshold, an activity threshold, etc.). The voltage can be generated by the voltage regulator 102. In some embodiments, the threshold value can correspond to a particular voltage (e.g., a voltage drop or IR drop) above which the SoC is consuming greater than defined power limit. Alternatively, the voltage threshold can correspond to a particular voltage below which the SoC is consuming too little power such that the components thereof do not receive an adequate amount of power.

Depending on the characteristics of the voltage regulator 102, (e.g. the voltage supply itself and/or wiring coupling the voltage supply to the components of the system) a voltage drop may occur when a high current event occurs. In this case, sensing the voltage using the sensing circuits 100-1 to 100-Q can assist in controlling resulting voltages that such voltages within the system are kept within the limits described herein. However, other types of voltage regulators may be capable to drive much higher currents and therefore may not exhibit such voltage drops. In this case, sensing the current using the sensing circuits 100-1 to 100-Q can allow the current within the system to be controlled such that currents within the system are kept within the limits described herein.

The apparatus further includes clock management circuitry 112-1 to 112-P configured to generate clocking signals for the SoC. The clock management circuitry 112-1 to 112-P can be further configured to alter a frequency of the generated clocking signals in response to the detected voltage, current, and/or activity meeting the threshold. In some embodiments, the frequency of the generated clocking signals is altered to alter an amount of power consumed by the SoC and/or an amount of power applied from the SoC to components external to the SoC.

The clock management circuitry 112-1 to 112-P can alter the frequency of the clocking signals by decreasing a frequency of a first portion of the clocking signals, increasing a frequency of a second portion of the clocking signals and/or decreasing a frequency of a third portion of the clocking signals as described in more detail in connection with FIGS. 5A-5D, herein. For example, the clock management circuitry 112-1 to 112-P can decrease a frequency of clocking signals for a first quantity of clock cycles, increase the frequency of clocking signals for a second quantity of clock cycles, and/or decrease the frequency of clocking signals for a third quantity of clock cycles. Although the frequency of clocking signals is altered in this non-limiting example for three distinct quantities of clocking signals (e.g., during three distinct time periods), embodiments are not so limited and the clock management circuitry 112-1 to 112-P can alter the frequency of clocking signals for greater than or less than three distinct quantities of clocking signals.

In some embodiments, the first portion of the clocking signals and the second portion of the clocking signals comprise a same quantity of clocking signals or the second portion of the clocking signals and the third portion of the clocking signals comprise a same quantity of clocking signals, or the first portion of the clocking signals and the third portion of the clocking signals comprise a same quantity of clocking signals, or at least one of the first portion of the clocking signals, the second portion of the clocking signals, and the third portion of the clocking signals comprises a different quantity of clock signals as a different one of the first portion of the clocking signals, the second portion of the clocking signals, and the third portion of the clocking signals. That is, the quantity of clocking signals and, hence, time periods during which each of the portions of clocking signals is altered, can be the same or different.

Continuing with this non-limiting example, the clock management circuitry 112-1 to 112-P can be configured to alter the frequency of the clocking signals by increasing a frequency of a first portion of the clocking signals, decreasing a frequency of a second portion of the clocking signals, and/or increasing a frequency of a third portion of the clocking signals. For example, the clock management circuitry 112-1 to 112-P can increase a frequency of clocking signals for a first quantity of clock cycles, decrease the frequency of clocking signals for a second quantity of clock cycles, and/or increase the frequency of clocking signals for a third quantity of clock cycles. Although the frequency of clocking signals is altered in this non-limiting example for three distinct quantities of clocking signals (e.g., during three distinct time periods), embodiments are not so limited and the clock management circuitry 112-1 to 112-P can alter the frequency of clocking signals for greater than or less than three distinct quantities of clocking signals.

As mentioned above, the first portion of the clocking signals and the second portion of the clocking signals comprise a same quantity of clocking signals or the second portion of the clocking signals and the third portion of the clocking signals comprise a same quantity of clocking signals, or the first portion of the clocking signals and the third portion of the clocking signals comprise a same quantity of clocking signals, or at least one of the first portion of the clocking signals, the second portion of the clocking signals, and the third portion of the clocking signals comprises a different quantity of clock signals as a different one of the first portion of the clocking signals, the second portion of the clocking signals, and the third portion of the clocking signals. That is, the quantity of clocking signals and, hence, time periods during which each of the portions of clocking signals is altered, can be the same or different.

In a different non-limiting example, a system includes a plurality of computing components 115 (e.g., controllers, memory devices, graphics processing units, processors of a computing device, logic blocks, etc.) coupled to a system-on-chip (SoC) (e.g., the SoC 101). In some embodiments, the plurality of computing components 115 are external to the SoC. The SoC, which can, in some embodiments, be an ASIC, includes a voltage regulator 102, a sensing circuit 100-1 to 100-Q, and clock management circuitry 112-1 to 112-P. The sensing circuit 100-1 to 100-Q can determine characteristics of a voltage received from the voltage regulator 102 and determine whether the characteristics of the voltage meet a voltage threshold (e.g., a particular voltage level, IR drop level, current level, activity level, etc.). In embodiments in which a voltage is detected, the characteristics of the voltage can include a voltage level, an amount of noise present in the voltage signal, and/or a change in the level of the voltage signal, among other characteristics associated with a voltage signal.

The clock management circuitry 112-1 to 112-P can generate clocking signals for the SoC (e.g., for components of the SoC such as the logic block A 114, the logic block B 116, and/or the logic block C 118, etc. that are resident on the SoC) and alter a frequency of the generated clocking signals in response to the characteristics of the voltage meeting the voltage threshold. The clock management circuitry 112-1 to 112-P can apply the clocking signals having the altered frequency to one or more of the plurality of computing components 115 or to one or more components of the SoC to alter an amount of power used by the SoC or an amount of power transferred from the SoC to the plurality of computing components 115.

Continuing with this non-limiting example, the clock management circuitry 112-1 to 112-P can alter the frequency of the clocking signals by decreasing a frequency of a first portion of the clocking signals, increasing a frequency of a second portion of the clocking signals, and/or decreasing a frequency of a third portion of the clocking signals. As described above, the clock management circuitry 112-1 to 112-P can decrease a frequency of clocking signals for a first quantity of clock cycles, increase the frequency of clocking signals for a second quantity of clock cycles, and/or decrease the frequency of clocking signals for a third quantity of clock cycles. Although the frequency of clocking signals is altered in this non-limiting example for three distinct quantities of clocking signals (e.g., during three distinct time periods), embodiments are not so limited and the clock management circuitry 112-1 to 112-P can alter the frequency of clocking signals for greater than or less than three distinct quantities of clocking signals.

Similarly, in some embodiments, the clock management circuitry 112-1 to 112-P can alter the frequency of the clocking signals by increasing a frequency of a first portion of the clocking signals, decreasing a frequency of a second portion of the clocking signals, and/or increasing a frequency of a third portion of the clocking signals. As described above, the clock management circuitry 112-1 to 112-P can increase a frequency of clocking signals for a first quantity of clock cycles, decrease the frequency of clocking signals for a second quantity of clock cycles, and/or increase the frequency of clocking signals for a third quantity of clock cycles. Although the frequency of clocking signals is altered in this non-limiting example for three distinct quantities of clocking signals (e.g., during three distinct time periods), embodiments are not so limited and the clock management circuitry 112-1 to 112-P can alter the frequency of clocking signals for greater than or less than three distinct quantities of clocking signals.

As mentioned above, the first portion of the clocking signals and the second portion of the clocking signals comprise a same quantity of clocking signals or the second portion of the clocking signals and the third portion of the clocking signals comprise a same quantity of clocking signals, or the first portion of the clocking signals and the third portion of the clocking signals comprise a same quantity of clocking signals, or at least one of the first portion of the clocking signals, the second portion of the clocking signals, and the third portion of the clocking signals comprises a different quantity of clock signals as a different one of the first portion of the clocking signals, the second portion of the clocking signals, and the third portion of the clocking signals. That is, the quantity of clocking signals and, hence, time periods during which each of the portions of clocking signals is altered, can be the same or different.

In some embodiments, the sensing circuits 100-1 to 100-Q can be deployed on, or otherwise included in a memory system (e.g., a storage device, a memory module, or a hybrid of a storage device and memory module). Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

In other embodiments, the sensing circuits 100-1 to 100-Q can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

Such computing devices can include a host system that is coupled to a memory system (e.g., one or more storage devices, memory modules, or a hybrid of a storage device and memory module). A host system can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system uses the storage device, the memory module, or a hybrid of the storage device and the memory module, for example, to write data to the storage device, the memory module, or the hybrid of a storage device and memory module and read data from the storage device, the memory module, or the hybrid of a storage device and memory module.

In these examples, the host system can include a processing unit such as a central processing unit (CPU) that is configured to execute an operating system. In some embodiments, the processing unit can execute a complex instruction set computer architecture, such an x86 or other architecture suitable for use as a CPU for a host system.

A host system can be coupled to a memory system via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system and the memory system. The host system can further utilize an NVM Express (NVMe) interface to access components when the memory system is coupled with the host system by the PCIe interface. The physical host interface can provide an interface for passing control, address, data, and other signals between the memory system and the host system. In general, the host system can access multiple memory sub-systems via a same communication connection, multiple separate communication connections, and/or a combination of communication connections.

A memory system can include any combination of the different types of non-volatile memory devices and/or volatile memory devices. The volatile memory devices can be, but are not limited to, random access memory (RAM), such as dynamic random-access memory (DRAM) and synchronous dynamic random access memory (SDRAM).

Some examples of non-volatile memory devices include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory components such as three-dimensional cross-point arrays of non-volatile memory cells and NAND type memory (e.g., 2D NAND, 3D NAND) are described, the memory device can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory system can also include additional circuitry or components. In some embodiments, a memory system can include a cache or buffer (e.g., DRAM) and address circuitry (e.g., a row decoder and a column decoder) that can receive an address from the memory system controller and decode the address to access the memory device(s).

In some embodiments, memory devices can include local media controllers that operate in conjunction with a memory system controller to execute operations on one or more memory cells of the memory devices. For example, an external controller can externally manage the memory device (e.g., perform media management operations on the memory device). In some embodiments, a memory device is a managed memory device, which is a raw memory device combined with a local controller for media management within the same memory device package. An example of a managed memory device is a managed NAND (MNAND) device.

FIG. 2 illustrates an example system 201 for transient load management in accordance with some embodiments of the present disclosure. The system 201 can be analogous to the system 101 illustrated in FIG. 1. Embodiments are not so limited, however, and in some embodiments, the system 201 can be analogous to at least one of the sensing circuits 100-1 to 100-Q illustrated in FIG. 1. The example system 201, which can be referred to in the alternative as an "apparatus 201," includes flip-flops 202-1, 202-2, 202-3, to 202-N. As shown in FIG. 2, the system 201 further includes clock gates 204-1, 204-2, 204-3, to 204-N (which are generally referred to as "clock gates 204-1 to 204-N," herein). The clock gates 204-1 to 204-N can receive a clock signal "CLK 203" from circuitry external to the system 201 illustrated in FIG. 2.

The components of the system 201, such as the latches/flip-flops 202-1 to 202-N, the clock gates 204-1 to 204-N, the latches/flip-flops 206-1 to 206-N, the adder circuits 208-1 to 208-N, the scale factor circuitry 212, and/or the adder circuit 214 can individually or collectively be referred to herein as a "system" or an "apparatus," given the context of the disclosure. Accordingly, one or more components of the system 201 (e.g., the latches/flip-flops 202-1 to 202-N, the clock gates 204-1 to 204-N, the latches/flip-flops 206-1 to 206-N, the adder circuits 208-1 to 208-N, the scale factor circuitry 212, and/or the adder circuit 214) can be provided on a single chip and/or a portion thereof. Similarly, one or more components of the system 200 (e.g., the latches/flip-flops 202-1 to 202-N, the clock gates 204-1 to 204-N, the latches/flip-flops 206-1 to 206-N, the adder circuits 208-1 to 208-N, the scale factor circuitry 212, and/or the adder circuit 214) can be provided on multiple chips and/or portions thereof.

As described above in connection with FIG. 1, The system 201 can include at least a portion of a system-on-chip (SoC), such as an application-specific integrated circuit (ASIC), field-programmable gate array (FPGA), etc. For example, the latches/flip-flops 202-1 to 202-N, the clock gates 204-1 to 204-N, the latches/flip-flops 206-1 to 206-N, the adder circuits 208-1 to 208-N, the scale factor circuitry 212, and/or the adder circuit 214 can be resident on a SoC, such as an ASIC, FPGA, or the like.

As shown in FIG. 2, The clock gates 204-1 to 204-N are coupled to respective groups of flip-flops 206-1, 206-2, 206-3, to 206-N (which are generally referred to as "groups of flip-flops 206-1 to 206-N," herein). The groups of flips-flops 206-1 to 206-N can, in some embodiments, be treated the same for purposes of generating the activity indication 210 if they have a sufficiently corresponding quantity of flip-flops associated therewith. For example, the group of flip-flops 206-1 includes four flip-flops while the group of flip-flops 206-3 includes three flip-flops. However, in order to simplify the operations described herein and to expedite calculation of the activity indicator 210, the group of flip-flops 206-1 and the groups of flip-flops 206-3 can be treated as having a same quantity of flip-flops for purposes determining simultaneously clocked flip-flops and can therefore be associated with a same adder circuit (e.g., the adder circuit 208-M). Similarly, the group of flip-flops 206-2 includes eight flip-flops while the group of flip-flops 206-N includes six flip-flops. However, in order to simplify the operations described herein and to expedite calculation of the activity indicator 210, the group of flip-flops 206-2 and the groups of flip-flops 206-N can be treated as having a same quantity of flip-flops for purposes determining simultaneously clocked flip-flops and can therefore be associated with a same adder circuit (e.g., the adder circuit 208-1).

The clock gates 204-1 to 204-N are further coupled to an adder circuit 208-1 and an adder circuit 208-M. The adder circuit 208-1 can be coupled to scale factor circuitry 212, which is in turn coupled to an adder circuit 214, while the adder circuit 208-M can be coupled directly to the adder circuit 214.

In some embodiments, the adder circuit 208-1 and the adder circuit 208-M can sum a quantity of open clock gates 204-1 to 204-N that are simultaneously open on a per-group basis (e.g., per each of the groups of flip-flops 206-1 to 206-N). As shown in FIG. 2, counts for higher weight adder circuit inputs (e.g., the group of flip-flops 206-2 and the group of flip-flops 206-N) can be normalized by applying a scale factor using the scale factor circuitry 212. In such embodiments, the adder circuit 214 then performs an operation to sum normalized and non-normalized counts collected from the adder circuit 208-1 and the adder circuit 208-M to generate a result that corresponds to the quantity of simultaneously clocked flip-flops. This information can in turn be used to generate the activity indication 210.

The group assignment (e.g., the assignment of flip-flops into the groups 206-1 to 206-N that are coupled to respective clock gates 204-1 to 204-N) illustrated in FIG. 2 can simplify performance of a normalization operation (e.g., an operation to apply the scale factor using the scale factor circuitry 212 to normalize counts collected from the adder circuit 208-1 and the adder circuit 208-M) by utilizing multiplication factors of "2" (e.g., by multiplication by 2, 4, 8, etc.) in comparison to approaches that employ shift operations (e.g., "shift left" or "shift right" operations) where a scale factor may be a scale factor that is not a multiple of "2."

In a non-limiting example, an apparatus (e.g., the system 200) can include a first group of flip-flops 206-1/206-3 coupled to a first adder circuit 208-M, a second group of flip-flops 206-2/206-N coupled to a second adder circuit 208-1, and a third adder circuit 214 coupled to the first adder circuit 208-M and the second adder circuit 208-1. The first adder circuit 208-M can receive information corresponding to a quantity of open clock gates 204-1/204-3 associated with the first group of flip-flops 206-1/206-3 and perform an operation to sum the quantity of open clock gates 204-1/204-3 associated with the first group of flip-flops 206-1/206-3.

The second adder circuit 208-1 can receive information corresponding to a quantity of open clock gates 204-2/204-N associated with the second group of flip-flops 206-2/206-N and perform an operation to sum the quantity of open clock gates 204-2/204-N associated with the second group of flip-flops 206-2/206-N.

Continuing with this non-limiting example, the third adder circuit 214 can receive a result of the operation to sum the quantity of open clock gates 204-1/204-3 associated with the first group of flip-flops 206-1/206-3 and receive a result of the operation to sum the quantity of open clock gates 204-2/204-N associated with the second group of flip-flops 206-2/206-N. The third adder circuit 214 can perform an operation to sum the quantity of open clock gates 204-1/204-3 associated with the first group of flip-flops 206-1/206-3 and the quantity of open clock gates 204-2/204-N associated with the second group of flip-flops 206-2/206-N and generate an activity indication 210 based, at least in part, on the result of the operation to sum the quantity of open clock gates 204-1/204-3 associated with the first group of flip-flops 206-1/206-3 and the quantity of open clock gates 204-2/204-*n* associated with the second group of flip-flops 206-2/206-N. In some embodiments, the activity indication is used in performance of a power management operation, as described herein.

As described above, the operations performed by the first adder circuit 208-M, the second adder circuit 208-1, and the third adder circuit 214 are performed as part of a power management operation. For example, the apparatus can further include clock management circuitry (e.g., the clock management circuitry 112-1 to 112-P illustrated in FIG. 1) and the clock management circuitry can receive the activity indication 210 and take an action to control an amount of voltage, and amount of current, or both, generated by the power management circuitry based on the activity indication.

In some embodiments, the apparatus further includes scale factor circuitry 212 coupled to the first adder circuit 208-M and/or the second adder circuit 208-1, and the third adder circuit 214. In such embodiments, the scale factor circuitry 212 is configured to apply a scale factor to a result of the operation to sum the quantity of open clock gates 204-1/204-3 associated with the first group of flip-flops 206-1/206-3 or a result of the operation to sum the quantity of open clock gates 204-2/204-N associated with the second group of flip-flops 206-1/206-N, or both. In some embodiments, the scale factor circuitry 214 is further configured to apply the scale factor to the result of the operation to sum the quantity of open clock gates 204-1/204-3 associated with the first group of flip-flops 206-1/206-3 or the result of the operation to sum the quantity of open clock gates 204-2/204-N associated with the second group of flip-flops 206-2/206-N based on which of the first group of flip-flops 206-1/206-3 and the second group of flip-flops 206-2/206-N contains a greater quantity of flip-flops.

In some embodiments, the first adder circuit 208-M and the second adder circuit 208-1 are configured to receive the information corresponding to the quantity of open clock gates 204-1/204-3 associated with the first group of flip-flops 206-1/206-3 and the information corresponding to the quantity of open clock gates 204-2/204-N associated with the second group of flip-flops 206-2/206-N concurrently. Embodiments are not so limited, however, and in some embodiments, the first adder circuit 208-M and the second adder circuit 208-1 are configured to receive the information corresponding to the quantity of open clock gates 204-1/204-3 associated with the first group of flip-flops 206-1/206-3 and the information corresponding to the quantity of open clock gates 204-2/204-N associated with the second group of flip-flops 206-2/206-N periodically based on a quantity of clock cycles that have elapsed since previous receipt of the information corresponding to the quantity of open clock gates 204-1/204-3 for the first group of flip-flops 206-1/206-3 and the information corresponding to the quantity of open clock gates 204-2/204-N for the second group of flip-flops 206-2/206-N.

FIG. 3 illustrates another example system 301 for transient load management in accordance with some embodiments of the present disclosure. The system 301 can be analogous to the system 101 illustrated in FIG. 1 and/or the system 201 illustrated in FIG. 2. Embodiments are not so limited, however, and in some embodiments, the system 301 can be analogous to at least one of the sensing circuits 100-1 to 100-Q illustrated in FIG. 1. For example, the sensor oscillator circuit 304-1, the voltage regulators 306-1 to 306-N, the reference oscillator circuits 308-1 to 308-N, and/or the frequency detectors 310-1 to 310-N can be constituent components of the sensing circuit 100-1 and/or the sensing circuit 100-Q illustrated in FIG. 1, herein.

The example system, which can be referred to in the alternative as an "apparatus," includes a voltage regulator 302 (e.g., a "first voltage regulator") that is configured to generate and apply a power supply signal (e.g., a supply voltage signal) to a sensor oscillator circuit 304-1 (e.g., a "first sensor oscillator circuit"). As shown in FIG. 3, the voltage regulator 302 is further configured to generate and apply the power supply signal to one or more logic blocks (i.e., the logic block A 314, the logic block B 316, and/or the logic block C 318). In some embodiments, the voltage regulator 302 can be analogous to the voltage regulator 102 illustrated in FIG. 1 and the logic blocks can be analogous to the logic blocks 114, 116, and 118 illustrated in FIG. 1.

The system 301 can further include voltage regulators 306-1 to 306-N, which can be coupled to the reference oscillator circuits 308-1 to 308-N. The reference oscillator circuits 308-1 to 308-N can be coupled to respective frequency detectors 310-1 to 310-2, which are coupled to a management circuit 312-1. The management circuit 312-1 can be analogous to the clock management circuit 112-1 illustrated in FIG. 1. As shown in FIG. 3, the management circuit 112-1 can provide timing signals (e.g., the "CLK" signal) to the logic block A 314 and/or to the logic block B 316; however, embodiments are not so limited, and in some embodiments, the management circuit 312-1 can be a power management circuit that provides power signals (e.g., regulated, altered, and/or modulated power signals) to the logic block A 314 and/or to the logic block B 316, and/or a voltage management circuit that provides voltage signals (e.g., regulated, altered, and/or modulated voltage signals) to the logic block A 314 and/or to the logic block B 316, and/or to other components that may be coupled to the system 301.

The reference oscillator circuits 308-1 to 308-N can further be coupled to additional frequency detectors, such as the frequency detectors 310-3 to 310-M. The frequency detectors 310-3 to 310-M can be coupled to the logic block C 318, which, as shown in FIG. 3, includes management circuitry 312-P and sensor oscillator circuit 304-X. In some embodiments, the management circuitry 312-P can be analogous to the clock management circuitry 112-P illustrated in FIG. 1. In the portion of the system 301 that includes the logic block C 318, the sensor oscillator circuit 304-X can be configured to transfer a sensed frequency signal to the frequency detectors 310-3 to 310-M.

In some embodiments, the sensor oscillator circuit 304-1 (and/or the sensor oscillator circuit 304-X) can be a free-running oscillator that is configured to convert the power supply signal received from the voltage regulator into an alternating current signal (or a "sensed frequency") and transfer the sensed frequency to the frequency detector 310-1 (or to the frequency detector 310-M in the case of the sensor oscillator circuit 304-X).

The reference oscillator circuits 308-1 to 308-N can be "reference" oscillators (i.e., oscillators that can be used to derive or generate a time reference and/or a frequency reference for other components of a system) and can be configured to receive a voltage signal from the voltage regulator 306-1 and the voltage regulator 306-N, respectively. The voltage regulators 306-1 to 306-N can generate a measured (e.g., known) voltage and transfer a voltage signal corresponding to the measured voltage to the reference oscillators 308-1 to 308-N, respectively. The reference oscillators 308-1 to 308-N can then generate and output a reference frequency.

In the embodiment shown in FIG. 3, the frequency detector 310-1 can receive the sensed frequency from the sensor oscillator circuit 304-1 and the reference frequency from the reference oscillator 308-1 and compare characteristics of the frequency of the sensed frequency and the reference frequency to determine if the sensed frequency and the reference frequency are the same or are different. Depending on whether the sensed frequency and the reference frequency are the same or are different, the system 301 can take an action (or cause an action to be taken) to track, limit, adjust or manipulate the dynamic power available to the system 301 to provide voltage manipulation (e.g., voltage drop compensation, voltage spike compensation, etc.) to the components thereof, or to components externally coupled to the system 301. In some embodiments, the action can include altering a clocking speed of, for example, one or more of the management circuits 312-1 to 312-P to limit, adjust or manipulate the dynamic power available to the system 301. As mentioned above, however, embodiments are not so limited and, in some embodiments, the management circuits 312-1 to 312-P can take an action to alter a power signal and/or a voltage signal to limit, adjust or manipulate the dynamic power available to the system 301.

FIG. 4 illustrates another example system 401 for transient load management in accordance with some embodiments of the present disclosure. The system 401 can be analogous to the system 101 illustrated in FIG. 1, the system 201 illustrated in FIG. 2, and/or the system 301 illustrated in FIG. 3. Embodiments are not so limited, however, and in some embodiments, the system 401 can be analogous to at least one of the sensing circuits 100-1 to 100-Q illustrated in FIG. 1. For example, the sensor oscillator circuit 404-1, the voltage regulators 406-1 to 406-N and/or the voltage regulators 407-1 to 407-N, the reference delay circuits 408-1 to 408-N, and/or the phase detectors 411-1 to 411-N can be constituent components of the sensing circuit 100-1 and/or the sensing circuit 100-Q illustrated in FIG. 1, herein.

The example system 401, which can be referred to in the alternative as an "apparatus," includes a voltage regulator 402, sensor oscillator circuits 404-1 to 404-X, voltage regulators 406-1 to 406-N and 407-1 to 407-N, management circuits 412-1 to 412-P, a logic block A 414, a logic block B 416, and a logic block 418, which can be analogous to the voltage regulator 302, the sensor oscillator circuits 304-1 to 304-X, the voltage regulators 306-1 to 306-N, the management circuits 312-1 to 312-P, the logic block A 314, the logic block B 316, and the logic block 318 of FIG. 3, respectively.

The system 401 of FIG. 4 further includes reference delay circuits 408-1 to 408-N, which are coupled to respective voltage regulators 406-1 to 406-N. The voltage regulators 406-1 to 406-N can be configured to alter a received voltage by a particular offset ("delta") value as shown in FIG. 4. For example, the voltage regulator 406-1 can be configured to receive a first (known) voltage "V1" signal and increment or decrement the magnitude of the received voltage signal by a particular offset value or "factor" (e.g., $+/-\Delta 1$). The voltage regulators 406-2, 406-3, to 406-N can, as shown in FIG. 4, be configured to receive a same or different voltage signal (e.g., V1 or V2, etc.) and apply a different offset (e.g., $+/-\Delta 2$, $+/-\Delta 3$, $+/-\Delta 4$, etc.).

The voltage signals can be received by respective reference delay circuits 408-1 to 408-N. In general, the reference delay circuits 408-1 to 408-N are hardware circuit electronic simulation devices for reproduction of a signal with a delay equal to a predetermined time interval. The reference delay circuits 408-1 to 408-N can be used for simulation of technological possesses associated with channeling of power and/or as components of automatic control and monitoring systems.

In the embodiment shown in FIG. 4, the system 401 includes phase detectors 411-1 to 411-M, which can receive a signal having a known or predetermined delay from the reference delay circuits 408-1 to 408-N. The phase detectors 411-1 to 411-M can compare characteristics of the phase of the sensed frequency and a frequency having a known or predetermined delay to determine if a phase of a signal associated with the sensed frequency and a phase of a signal associated with the reference (e.g., delayed) frequency are the same or are different. Depending on whether the phase of the sensed frequency and the phase of the reference frequency are the same or are different, the system 401 can take an action (or cause an action to be taken) to track, limit, adjust or manipulate the dynamic power available to the system 401 to provide voltage manipulation to the components thereof, or to components externally coupled to the system 401. In some embodiments, the action can include altering a clocking speed of, for example, one or more of the management circuits 412-1 to 412-P to limit, adjust or manipulate the dynamic power available to the system 401. As mentioned above, however, embodiments are not so limited and, in some embodiments, the management circuits 412-1 to 412-P can take an action to alter a power signal and/or a voltage signal to dynamically or otherwise limit, adjust or manipulate the voltage, current, and/or power, among other signaling parameters, available to the system 401.

Although FIG. 4 illustrates and embodiment in which the reference delay circuits 408-1 to 408-N act as a reference circuit, embodiments herein contemplate scenarios in which the reference delay circuits 408-1 to 408-N can operate as sensing circuits analogous to the sensor oscillator circuits 404-1 to 404-X. In such embodiments, the sensor oscillator circuits 404-1 to 404-X can essentially be swapped with the reference delay circuits 408-1 to 408-N to perform the operations described herein.

Figure 5A:
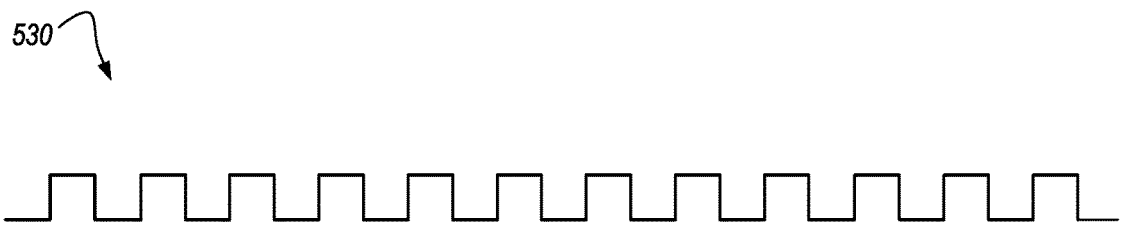
FIG. 5A-5D illustrates example clocking signals for transient load management in accordance with some embodiments of the present disclosure.
Figure 5B:
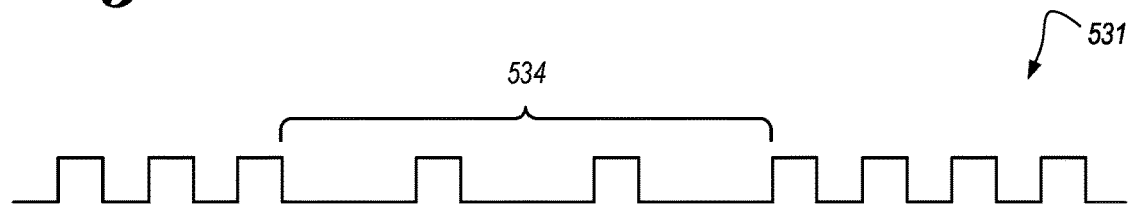
Figure 5C:
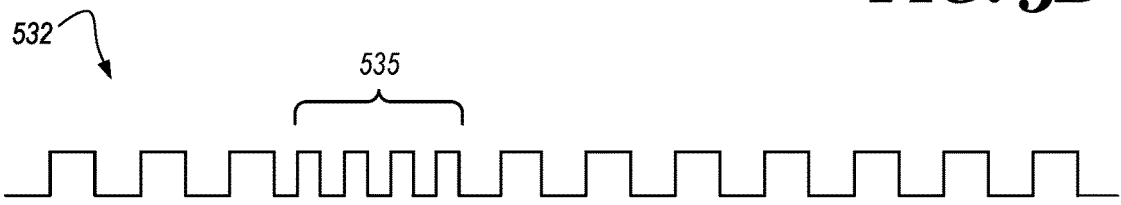

FIGS. 5A-5D illustrate example clocking signals 530, 531, 532, 533 for transient load management in accordance with some embodiments of the present disclosure. Although shown in FIGS. 5A-5D as square waves, the clocking signals 530, 531, 532, and/or 533 can be any periodically occurring signal (e.g., saw waves, sine waves, etc.). The clocking signals 530, 531, 532, and/or 533 can be generated by clock management circuitry, such as the clock management circuitry 112-1 to 112-P illustrated in FIG. 1, herein. FIG. 5A illustrates clocking signals 530 that can be generated by the clock management circuitry during normal (e.g., in the absence of detection of a transient load) operation of a system, such as the systems 101, 201, 301, and/or 401 illustrated in FIGS. 1-4, herein.

As part of providing transient load management as described herein, the clocking signals 531, 532, and 533 have been altered by, for example, the clock management circuitry. For example, a portion 534 of the clocking signals 531 illustrated in FIG. 5B have been altered such that the frequency of the clocking signals 531 is reduced for the portion 534 (e.g., during a time period associated with the portion 534 of the clocking signals 531). Conversely, a portion 535 of the clocking signals 532 illustrated in FIG. 5C have been altered such that the frequency of the clocking signals 532 is increased for the portion 535 (e.g., during a time period associated with the portion 535 of the clocking signals 532). As described above, by altering a portion 534 and/or 535 of the clocking signals 531 and/or 532, power consumption of a system can be altered to attenuate a voltage overshoot (in the example shown in FIG. 5C) or to prepare for the transient load to be released or dissipate (in the example shown in FIG. 5B).

Figure 5D:
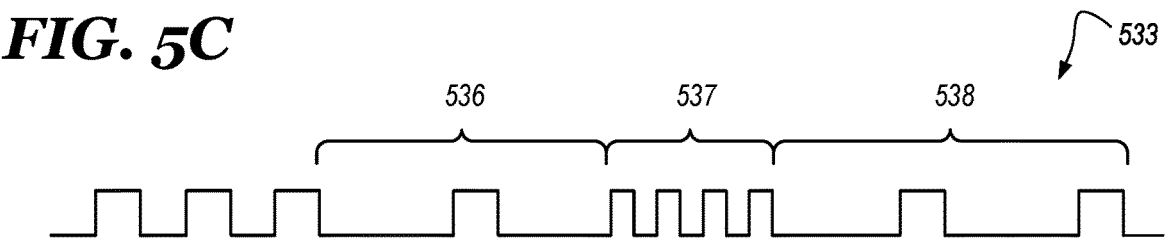

In FIG. 5D different portions 536, 537, and 538 of the example clocking signals 533 are altered. For example, a frequency of the clocking signals 533 is reduced for the portion 536 of the clocking signals 533, then increased for the portion 537 of the clocking signals 533, and then subsequently reduced for the 538 of the clocking signals 533. As mentioned above, these "portions" (e.g., the portion 536, 537, and/or 538) can correspond to different periods of time. Further, although the portions 536 and 538 are shown in FIG. 5D as having a reduced frequency in comparison to the clocking signals 531, it is contemplated that the portions 536 and 538 of the clocking signals 533 could have a frequency associated therewith increased (similar to the portion 537 illustrated in FIG. 5D) while the portion 537, which is shown in FIG. 5D as having an increased frequency in comparison to the clocking signals 531 could have a frequency associated therewith reduced (similar to the portions 536 and 538 illustrated in FIG. 5D).

Further, although shown in FIG. 5D as three distinct portions 536, 537, and 538, any number of portions are contemplated herein. For example, there can be greater than three portions or fewer than three portions depending on the transient load to be managed. Further, although each of the portions 536, 537, and 538 are illustrated as having a particular quantity of clock cycles associated therewith, each of the portions 536, 537, and/or 538 can have greater than or fewer than the quantity of clock cycles illustrated in FIGS. 5B-5C depending on the transient load to be managed.

By altering the clocking signals 531, 532, and/or 533 in connection with aspects of the present disclosure, power savings in the system may be realized. In addition, power mesh characteristics may be relaxed, hold time closure may be improved, and/or other aspects associated with voltage and/or current behavior in the system may be improved in comparison to approaches that do not employ the transient load management techniques disclosed herein. Moreover, by altering the clocking signals 531, 532, and/or 533 in connection with aspects of the present disclosure, it becomes possible to ensure that the system does not consume power above a predefined power limit associated with the system even in the presence of process variation and/or temperature variation.

Figure 6:
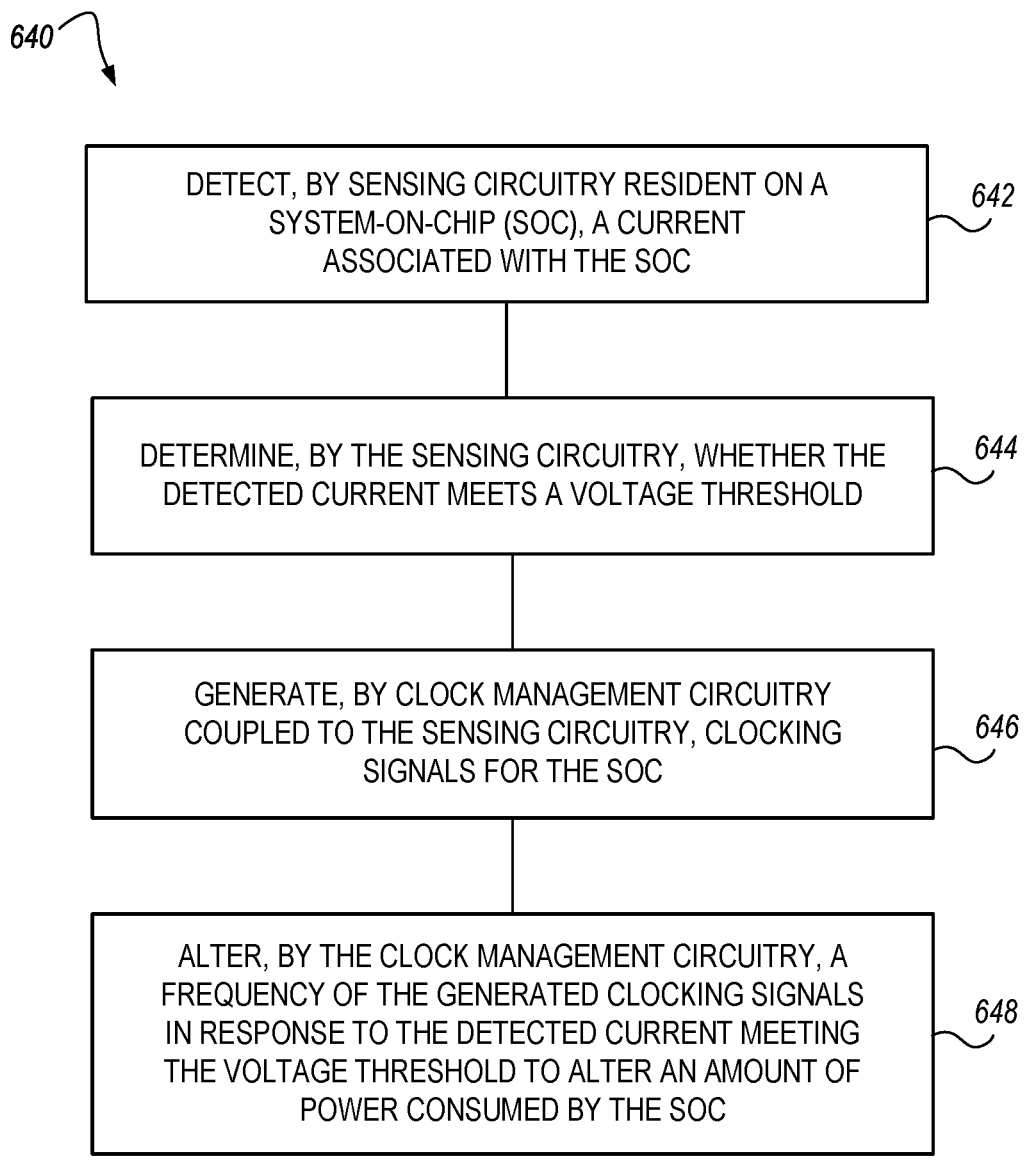
FIG. 6 is a flow diagram corresponding to a method for transient load management in accordance with some embodiments of the present disclosure.

FIG. 6 is a flow diagram corresponding to a method 640 for transient load management in accordance with some embodiments of the present disclosure. The method 640 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 640 is performed by one or more components of the voltage sensing circuit 100 of FIG. 1 and/or one or more components of the systems 201, 301, and 401 illustrated in FIGS. 2-4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 642, sensing circuitry detects a current and/or a voltage associated with a system-on-chip (SoC). The sensing circuitry can be analogous to the sensing circuitry 100-1 to 100-Q illustrated in FIG. 1 and the SoC can be analogous to the systems 101, 201, 301, and/or 401 illustrated in FIGS. 1-4, herein. As described above, in some embodiments, the sensing circuitry is resident on the SoC.

At operation 644, the sensing circuitry can determine whether the detected current meets a threshold. As described above, the threshold can correspond to a transient load that occurs, for example, as a result of a current overshoot (or "spike"), an activity increase or decrease, a voltage drop, or an IR drop, among other possibilities.

At operation 646, clock management circuitry generates clocking signals for the SoC. The clock management circuitry can be analogous to the clock management circuitry 112-1 to 112-P illustrated in FIG. 1. As described above, the clock management circuitry can be coupled to the sensing circuitry. In some embodiments, the clocking signals can be analogous to the clocking signals 531 illustrated in FIG. 5A, herein.

At operation 648, the clock management circuitry alters a frequency of the generated clocking signals in response to the detected current meeting the threshold. In some embodiments, the generated clocking signals are altered to alter an amount of power consumed and/or generated by the SoC. That is, the generated clocking signals can be altered dynamically to change a frequency associated with the clocking signals (as described in connection with FIGS. 5A-5D, herein) in order to attenuate current overshoots and/or voltage deficiency events for components of the SoC and/or for components external to SoC (e.g., the computing components 115 described in connection with FIG. 1, herein). Accordingly, in some embodiments, the method 640 includes altering, by the clock management circuitry, the frequency of the generated clocking signals in response to the detected current meeting the threshold to alter an amount of power consumed by one or more components external to the SoC.

The method 640 can further include operations that include decreasing a frequency of a first portion of the clocking signals, increasing a frequency of a second portion of the clocking signals, and decreasing a frequency of a third portion of the clocking signals. In the alternative, the method 640 can further include operations comprising increasing a frequency of a first portion of the clocking signals, decreasing a frequency of a second portion of the clocking signals, and increasing a frequency of a third portion of the clocking signals.

As described in more detail in connection with FIG. 1, above, the first portion of the clocking signals and the second portion of the clocking signals can comprise a same quantity of clocking signals, or the second portion of the clocking signals and the third portion of the clocking signals can comprise a same quantity of clocking signals, or the first portion of the clocking signals and the third portion of the clocking signals can comprise a same quantity of clocking signals, or at least one of the first portion of the clocking signals, the second portion of the clocking signals, and the third portion of the clocking signals comprises a different quantity of clock signals as a different one of the first portion of the clocking signals, the second portion of the clocking signals, and the third portion of the clocking signals.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   sensing circuitry configured to:
      detect activity associated with a system-on-chip (SoC); and
      determine whether the detected activity meets a threshold; and
   clock management circuitry configured to:
      generate clocking signals for the SoC; and
      alter a frequency of the generated clocking signals in response to the detected activity meeting the threshold to:
         alter an amount of power consumed by the SoC; and
         alter an amount of power applied from the SoC to components external to the SoC.

2. The apparatus of claim 1, wherein the sensing circuitry is configured to detect the activity associated with the SoC by detecting a voltage, a current, or an activity indication, or any combination thereof.

3. The apparatus of claim 1, wherein the clock management circuitry is configured to alter the frequency of the clocking signals by decreasing a frequency of a first portion of the clocking signals.

4. The apparatus of claim 3, wherein the clock management circuitry is further configured to alter the frequency of the clocking signals by:
   increasing a frequency of a second portion of the clocking signals; and
   decreasing a frequency of a third portion of the clocking signals.

5. The apparatus of claim 4, wherein:
   the first portion of the clocking signals and the second portion of the clocking signals comprise a same quantity of clocking signals, or
   the second portion of the clocking signals and the third portion of the clocking signals comprise a same quantity of clocking signals, or
   the first portion of the clocking signals and the third portion of the clocking signals comprise a same quantity of clocking signals, or
   at least one of the first portion of the clocking signals, the second portion of the clocking signals, and the third portion of the clocking signals comprises a different quantity of clock signals as a different one of the first portion of the clocking signals, the second portion of the clocking signals, and the third portion of the clocking signals.

6. The apparatus of claim 1, wherein the clock management circuitry is configured to alter the frequency of the clocking signals by increasing a frequency of a first portion of the clocking signals.

7. The apparatus of claim 6, wherein the clock management circuitry is further configured to alter the frequency of the clocking signals by:
   decreasing a frequency of a second portion of the clocking signals; and
   increasing a frequency of a third portion of the clocking signals.

8. The apparatus of claim 7, wherein:
   the first portion of the clocking signals and the second portion of the clocking signals comprise a same quantity of clocking signals, or
   the second portion of the clocking signals and the third portion of the clocking signals comprise a same quantity of clocking signals, or
   the first portion of the clocking signals and the third portion of the clocking signals comprise a same quantity of clocking signals, or
   at least one of the first portion of the clocking signals, the second portion of the clocking signals, and the third portion of the clocking signals comprises a different quantity of clock signals as a different one of the first portion of the clocking signals, the second portion of the clocking signals, and the third portion of the clocking signals.

9. The apparatus of claim 1, wherein the clock management circuitry comprises throttling circuitry, clock division circuitry, or a voltage-controlled oscillator, a clock synthesizer, or a phase-locked loop system, or any combination thereof.

10. The apparatus of claim 1, wherein the sensing circuitry comprises an analog comparator, an oscillator circuit, a phase detection circuit, or a digital-to-analog converter, or any combination thereof.

11. A method, comprising:
   detecting, by sensing circuitry resident on a system-on-chip (SoC), a current associated with the SoC;
   determining, by the sensing circuitry, whether the detected current meets a threshold;
   generating, by clock management circuitry coupled to the sensing circuitry, clocking signals for the SoC; and
   altering, by the clock management circuitry, a frequency of the generated clocking signals in response to:
      the detected current meeting the threshold to alter an amount of power consumed by the SoC; and
      the detected current meeting the threshold to alter an amount of power applied from the SoC to components external to the SoC.

12. The method of claim 11, further comprising:
   decreasing a frequency of a first portion of the clocking signals;
   increasing a frequency of a second portion of the clocking signals; and
   decreasing a frequency of a third portion of the clocking signals.

13. The method of claim 12, wherein:
   the first portion of the clocking signals and the second portion of the clocking signals comprise a same quantity of clocking signals, or
   the second portion of the clocking signals and the third portion of the clocking signals comprise a same quantity of clocking signals, or
   the first portion of the clocking signals and the third portion of the clocking signals comprise a same quantity of clocking signals, or
   at least one of the first portion of the clocking signals, the second portion of the clocking signals, and the third portion of the clocking signals comprises a different quantity of clock signals as a different one of the first portion of the clocking signals, the second portion of the clocking signals, and the third portion of the clocking signals.

14. The method of claim 11, further comprising:
increasing a frequency of a first portion of the clocking signals;
decreasing a frequency of a second portion of the clocking signals; and
increasing a frequency of a third portion of the clocking signals.

15. The method of claim 14, wherein:
the first portion of the clocking signals and the second portion of the clocking signals comprise a same quantity of clocking signals, or
the second portion of the clocking signals and the third portion of the clocking signals comprise a same quantity of clocking signals, or
the first portion of the clocking signals and the third portion of the clocking signals comprise a same quantity of clocking signals, or
at least one of the first portion of the clocking signals, the second portion of the clocking signals, and the third portion of the clocking signals comprises a different quantity of clock signals as a different one of the first portion of the clocking signals, the second portion of the clocking signals, and the third portion of the clocking signals.

16. The method of claim 11, further comprising altering, by the clock management circuitry, the frequency of the generated clocking signals in response to the detected current meeting the threshold to alter an amount of power consumed by one or more components external to the SoC.

17. A system, comprising:
a plurality of computing components coupled to a system-on-chip (SoC), wherein the SoC comprises:
  a voltage regulator;
  a sensing circuit configured to:
    determine characteristics of a voltage received from the voltage regulator; and
    determine whether the characteristics of the voltage meet a voltage threshold; and
  clock management circuitry configured to:
    generate clocking signals for the SoC;
    alter a frequency of the generated clocking signals and alter an amount of power applied from the SoC to components external to the SoC in response to the characteristics of the voltage meeting the voltage threshold; and
    apply the clocking signals having the altered frequency to one or more of the plurality of computing components or to one or more components of the SoC to alter an amount of power used by the SoC.

18. The system of claim 17, wherein the plurality of computing components are external to the SoC.

19. The system of claim 17, wherein the one or more of the plurality of computing components comprise a memory device, a controller, a graphics processing unit, a processing device, or a logic block, or any combination thereof.

20. The system of claim 17, wherein the one or more components of the SoC are resident on the SoC and comprise one or more logic blocks.

21. The system of claim 17, wherein the SoC comprises an application-specific integrated circuit.

22. The system of claim 17, wherein the clock management circuitry is configured to alter the frequency of the clocking signals by:
decreasing a frequency of a first portion of the clocking signals;
increasing a frequency of a second portion of the clocking signals; and
decreasing a frequency of a third portion of the clocking signals.

23. The system of claim 17, wherein the clock management circuitry is configured to alter the frequency of the clocking signals by:
increasing a frequency of a first portion of the clocking signals;
decreasing a frequency of a second portion of the clocking signals; and
increasing a frequency of a third portion of the clocking signals.

* * * * *